United States Patent
Fukuda et al.

(10) Patent No.: US 7,004,381 B2
(45) Date of Patent: Feb. 28, 2006

(54) CASH DISPENSING MACHINE

(75) Inventors: Hiromichi Fukuda, Tokyo (JP); Nobuhito Fujii, Tokyo (JP)

(73) Assignees: Aruze Corporation, Tokyo (JP); Seta Corporation, Tokyo (JP)

( * ) Notice: Subject to any disclaimer, the term of this patent is extended or adjusted under 35 U.S.C. 154(b) by 0 days.

(21) Appl. No.: 10/873,025

(22) Filed: Jun. 21, 2004

(65) Prior Publication Data

US 2004/0262380 A1 Dec. 30, 2004

(30) Foreign Application Priority Data

Jun. 27, 2003 (JP) ............................... 2003-185669

(51) Int. Cl.
*G06F 17/00* (2006.01)
*G06F 17/60* (2006.01)

(52) U.S. Cl. .................... 235/375; 235/379; 705/43; 705/45

(58) Field of Classification Search ................. 235/375, 235/379; 705/43–45; 463/25, 29
See application file for complete search history.

(56) References Cited

U.S. PATENT DOCUMENTS

| 6,264,556 | B1 * | 7/2001 | Izawa et al. ................... 463/25 |
| 6,454,163 | B1 * | 9/2002 | Peebles et al. .............. 235/379 |
| 6,516,998 | B1 * | 2/2003 | Calder et al. ................ 235/381 |
| 6,742,644 | B1 * | 6/2004 | Heidel ......................... 194/206 |
| 6,745,887 | B1 * | 6/2004 | Heidel et al. ................ 194/206 |
| 2004/0033832 | A1 * | 2/2004 | Solomon ...................... 463/25 |

FOREIGN PATENT DOCUMENTS

JP    H08-123991    5/1996

* cited by examiner

*Primary Examiner*—Thien M. Le
*Assistant Examiner*—April Taylor
(74) *Attorney, Agent, or Firm*—DeLio & Peterson, LLC; Peter W. Peterson

(57) ABSTRACT

A cash dispensing machine includes a validation unit 13 for validating cash inserted through an insertion slot 8, a detachable storage unit 30 for storing cash validated by the validation unit 13, communication means provided in each of the validation unit and the storage unit, for transmitting and receiving information of the cash related to cash validated by the validation unit and an ID information of the cash and a memory unit 37 provided in the storage unit 30, for storing information of the cash transmitted from the validation unit 13 in association with the ID information.

5 Claims, 6 Drawing Sheets

Fig. 6

| I D | Money received |
|---|---|
| A-001 | 10,000 |
| A-001 | 10,000 |
| A-001 | 10,000 |
| A-006 | 10,000 |
| A-006 | 5,000 |
| B-018 | 10,000 |
| | |
| | |
| | |

(a)

| I D | Money received |
|---|---|
| A-001 | 30,000 |
| A-006 | 15,000 |
| B-018 | 10,000 |
| | |
| | |
| | |
| | |
| | |
| | |

(b)

CASH DISPENSING MACHINE

CROSS-REFERENCE TO THE RELATED APPLICATION

This application is based upon and claims a priority from the prior Japanese patent application No. 2003-185669, the entire contents of which are incorporated herein by reference.

BACKGROUND OF THE INVENTION

1. Field of the Invention

The present invention relates to a cash dispensing machine for use in a gaming machine such as slot machine, etc., or an automatic vending machine.

2. Prior Art

An example of a conventional cash dispensing machine for use in a gaming machine, etc., is disclosed in JPH8-123991A. The disclosed cash dispensing machine is constructed with a validation unit for validating cash inserted into the gaming machine through an insertion slot thereof and a storage unit for storing the cash, which are inserted into the gaming machine and validated by the validation unit.

The storage unit provided in the cash dispensing machine of this type sequentially stores cash such as coins or bills, which are inserted into the gaming machine and are validated by the validation unit, and, in order to collect the cash stored within the storage unit, the storage unit is made detachable from a main body of the cash dispensing machine. That is, the storage unit can be transported with cash therein by detaching it from the cash dispensing machine. In order to prevent cash from being easily taken out from the storage unit during transportation thereof, the storage unit is solidly constructed with sturdy and heavy materials so that it functions as a kind of portable cash box.

In another example of the conventional cash dispensing machine, a reclosable lid of a storage unit is automatically locked and unlocked. As a device for automatically locking and unlocking the reclosable lid, a motor or a solenoid is usually used and electric power for driving the motor or the solenoid is fed from the cash dispensing machine or a connecting device through terminals provided in the storage unit, as to be described later.

Further, in order to make a confirmation of missing cash stored in the storage unit detached from the cash dispensing machine during transportation thereof possible after transported, information including the kinds of cash and amounts of respective kinds of cash stored in the storage unit may be recognized by the validation unit of the cash dispensing machine and memorized in the storage unit. An information signal related to the kind and the amount of cash is supplied from the validation unit to the storage unit through connecting terminals provided in the main body of the cash dispensing machine and the storage unit and stored in such as non-volatile memory housed in the storage unit.

The storage unit transported as mentioned above is set on, for example, a storage unit connecting device provided at a cash collecting location. The reclosable lid is unlocked and the stored information of the kind and amount of cash can be read through a terminal computer connected to the connecting terminals.

As mentioned, information of the amount of cash, which is validated by the validation unit, that is, information of the cash received is stored in the memory unit of the storage unit.

On the other hand, depending upon the business environment (for example, long business hours) and the managing environment of corporate accounts of the amusement center, etc., there may be a case where the storage unit of the cash dispensing machine of a gaming machine, whose utilization rate is high, and that of a gaming machine, whose utilization rate is low, are detached from the respective cash dispensing machines and exchanged. Alternatively, there may be a case where a storage unit is removed from a cash dispensing machine of a gaming machine, which is not utilized by anyone during business hours, and mounted on the cash dispensing machine again or a cash dispensing machine of another gaming machine, after a current amount of cash in the storage unit is confirmed by the terminal computer without collecting the cash in the storage unit.

When such operation is performed, cash inserted into a plurality of gaming machines may be mixed in one storage unit. In such case, there is a problem in business management that, although it is possible to know a total amount of cash in the storage unit, it does not allow knowing a gaming machine or gaming machines from which the cash is collected.

SUMMARY OF THE INVENTION

The present invention relates to a storage unit, which is detachable from a cash dispensing machine and an object of the present invention is to provide a cash dispensing machine having the storage unit with which it is easy to distinguish a cash dispensing machine from which cash in the storage unit is collected.

In order to achieve the above object, a cash dispensing machine according to the present invention comprises a validation unit for validating cash inserted through an insertion slot thereof, a detachable storage unit for storing cash validated by the validation unit, first communication means provided in the validation unit, and transmitting information of the cash and ID information of the cash, to the storage unit, second communication means provided in the storage unit, and receiving the information and the ID information from the first communication means and a memory unit provided in the said storage unit, checking the information against the ID information and storing the information and the ID information.

With such construction, the validity of cash (authenticity of cash) inserted through an insertion slot of a gaming machine is validated by the validation unit and valid cash is stored in the storage unit. On this occasion, in the validation unit, information related to cash stored in the storage unit, that is, information related to kind and value of cash, and the identification (ID) information preliminarily assigned to the validation unit are transmitted to the storage unit through the communication means and stored in the memory unit of the storage unit by associating information of the cash with the ID information.

Therefore, even if the storage unit of a cash dispensing machine of a certain gaming machine, which contains cash therein, is detached from the certain cash dispensing machine and shifted to those of other gaming machines sequentially, it is possible to correctly manage the cash collecting information of every gaming machine since information of the cash and the ID information of the validation unit of the gaming machines are stored in the memory unit of the storage unit.

Incidentally, it should be noted that the term "cash" used in this specification means a medium used for exchanging things. In more detail, the term "cash" covers any portable medium usable in playing games or purchasing things. For example, the term "cash" covers general currency such as coins and bills and various medals valid in only specific game centers. Further, the construction of the storage unit and a construction of the insertion slot may be modified suitably according to the kind of "cash" used.

According to the present invention, the storage unit can transmit information of the cash and the ID information to an upper means such as a personal computer (PC) through the communication means thereof.

With such construction of the storage unit, it is possible to read information of the cash and the ID information related thereto, which are stored in the memory unit of the storage unit through the communication means thereof by detaching the storage unit from the cash dispensing machine and connecting the storage unit to the personal computer. Therefore, information of the cash and the ID information thus read out can be utilized in managing cash, total cash received and gaming machine, etc. In such case, the connection of the storage unit to the upper means may be performed directly or indirectly through a repeater provided between the storage unit and the upper means in order to make a communication protocol common.

BRIEF DESCRIPTION OF THE DRAWINGS

FIG. 6(a) and FIG. 6(b) show examples of a recording method for recording information related to the cash in association with ID information.

DETAILED DESCRIPTION OF THE PREFERRED EMBODIMENTS

Figure 1:
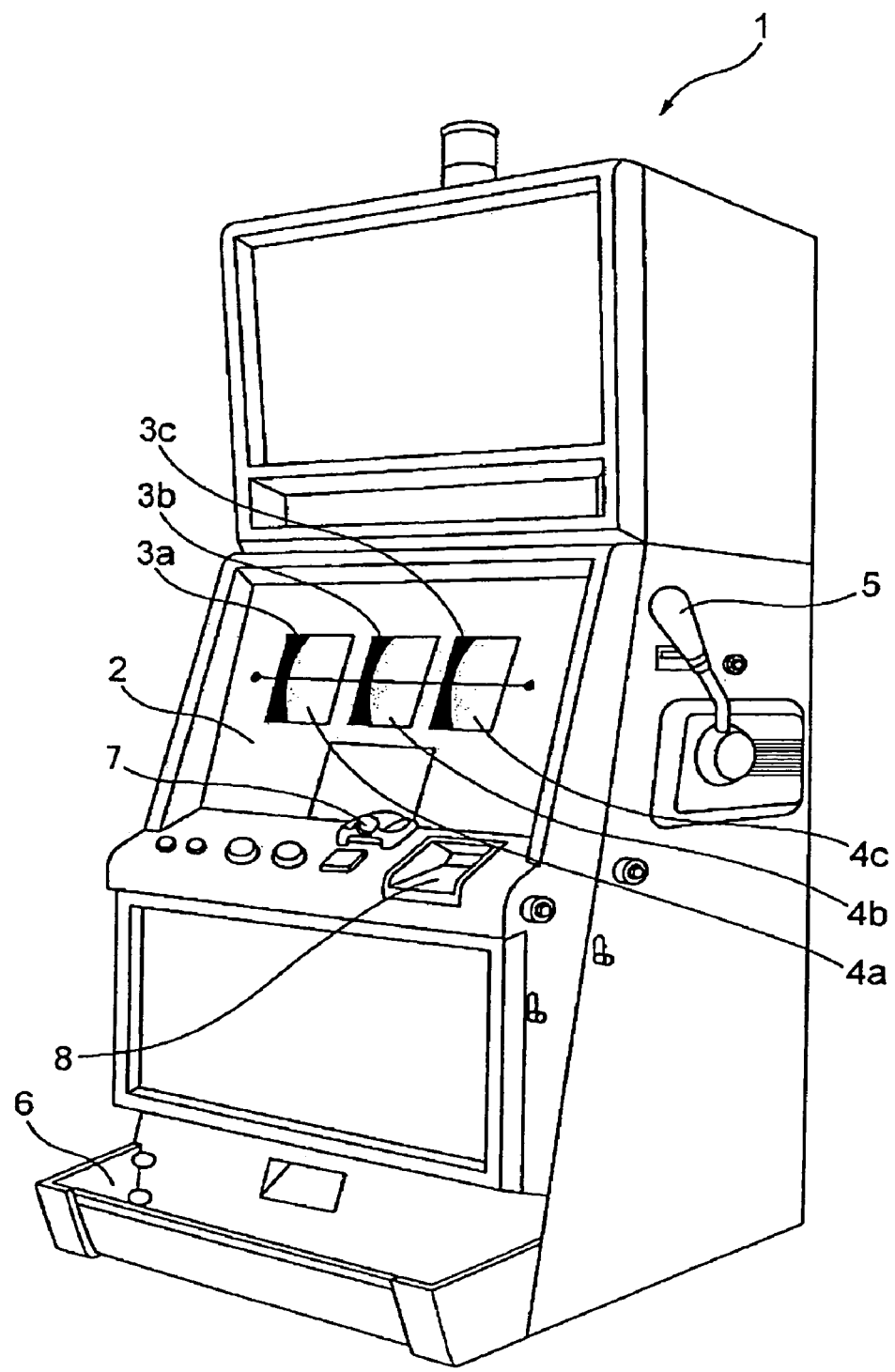
FIG. 1 is a perspective view of a slot machine on which a cash dispensing machine according to the present invention is mounted.

FIG. 1 is a perspective view of a gaming machine 1, which is a slot machine, on which a cash dispensing machine according to the present invention is mounted.

In FIG. 1, the slot machine 1 includes a reclosable front panel 2 having three rectangular display windows 3a to 3c juxtaposed in a horizontal direction and three reels 4a to 4c, which can be rotated independently, provided behind the respective display windows 3a to 3c. A plurality of pictures are drawn on an outer peripheral surface of each of the reels 4a to 4c.

The reels 4a to 4c are rotated by operating an operation lever 5 and, when an arrangement of the pictures on the outer surfaces of the reels 4a to 4c become a predetermined one when these reels are stopped, coins or medals are delivered to a tray 6 as a prize. Incidentally, this game is started by inserting a coin or a medal into a coin slot 7 arranged below the display windows 3a to 3c or inserting a bill into a bill insertion slot 8 also arranged below the display windows.

Figure 2:
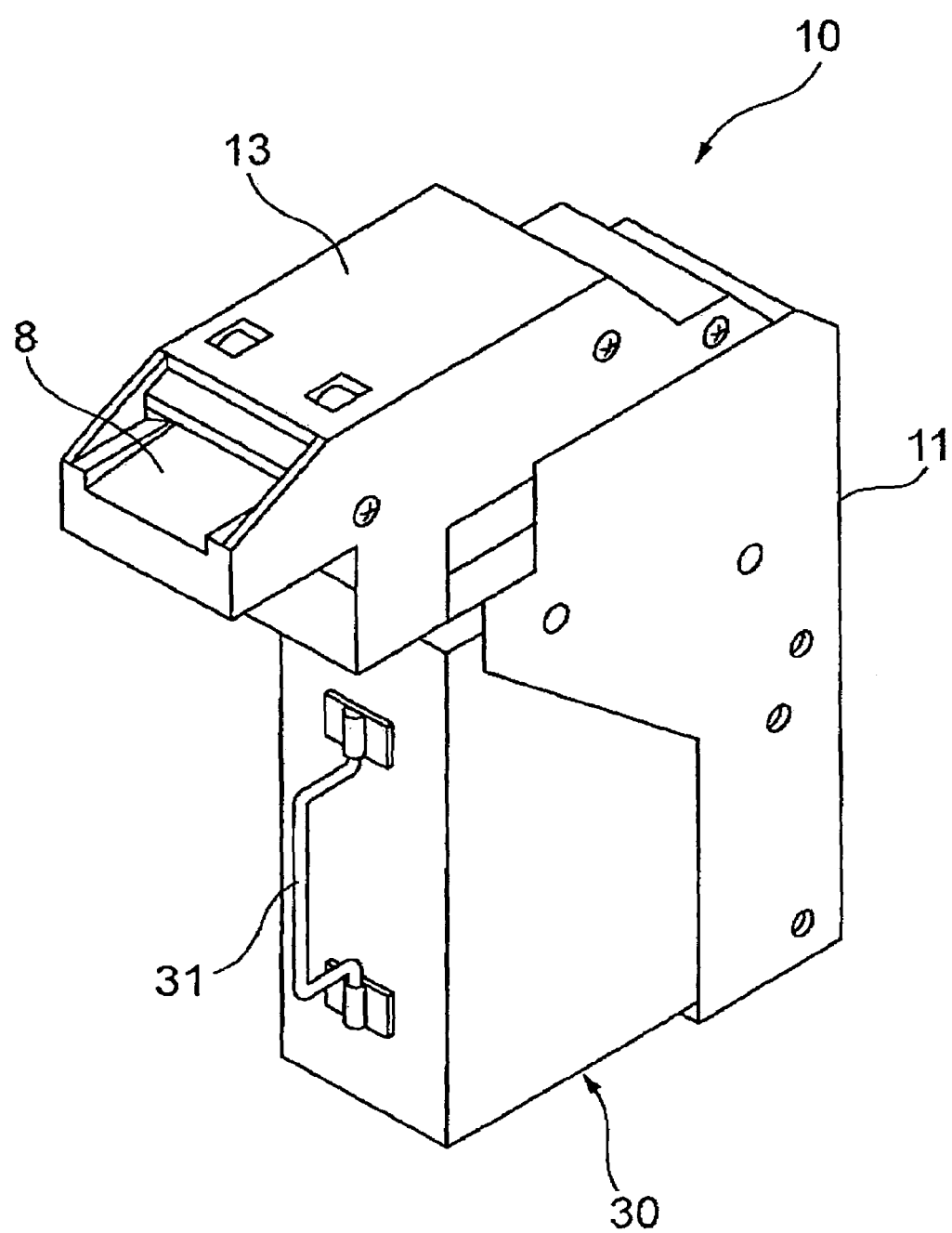
FIG. 2 is a perspective view of an example of the cash dispensing machine according to the present invention.
Figure 3:
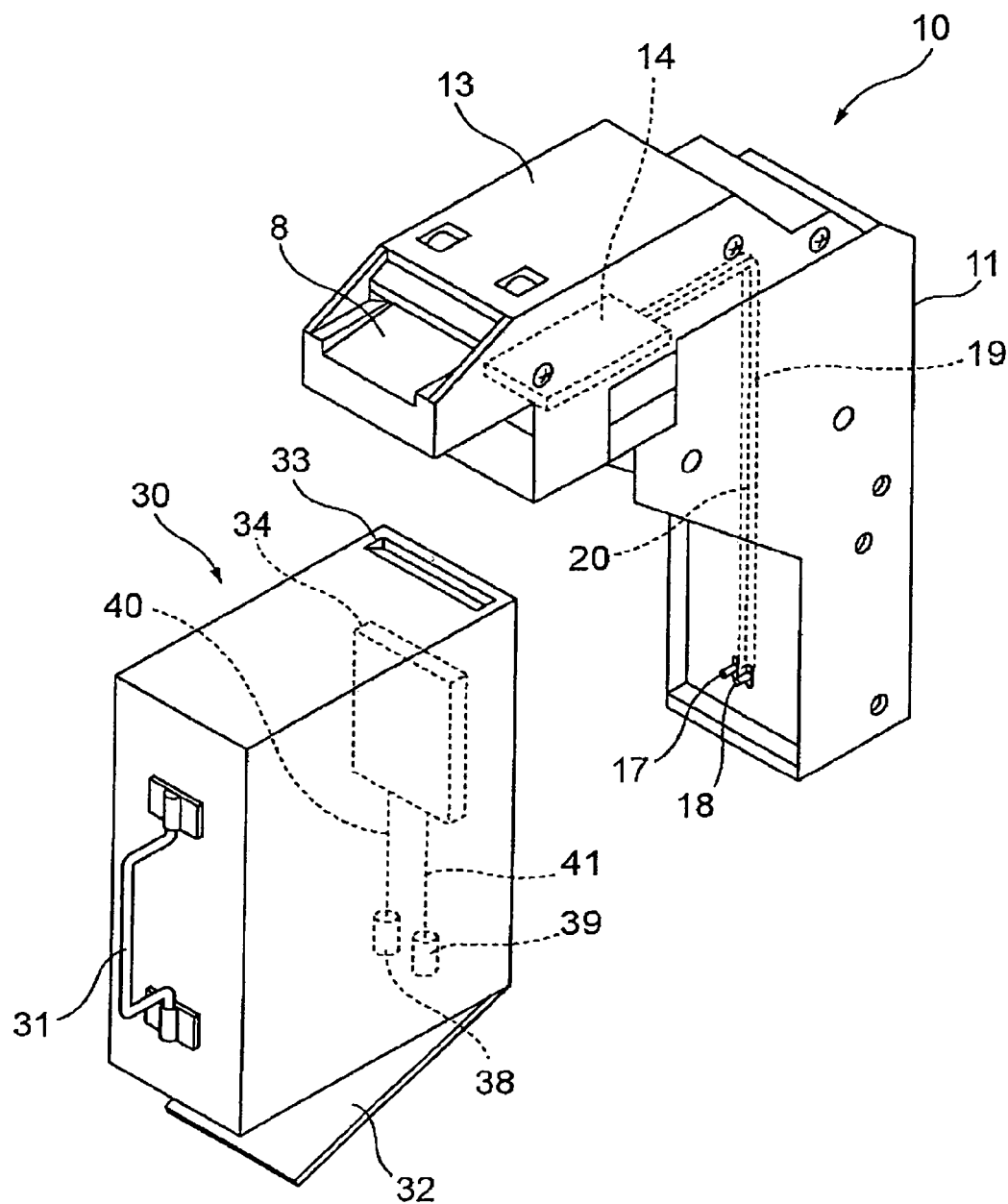
FIG. 3 is a perspective view of the cash dispensing machine with a storage unit thereof being separated from the cash dispensing machine.
Figure 4:
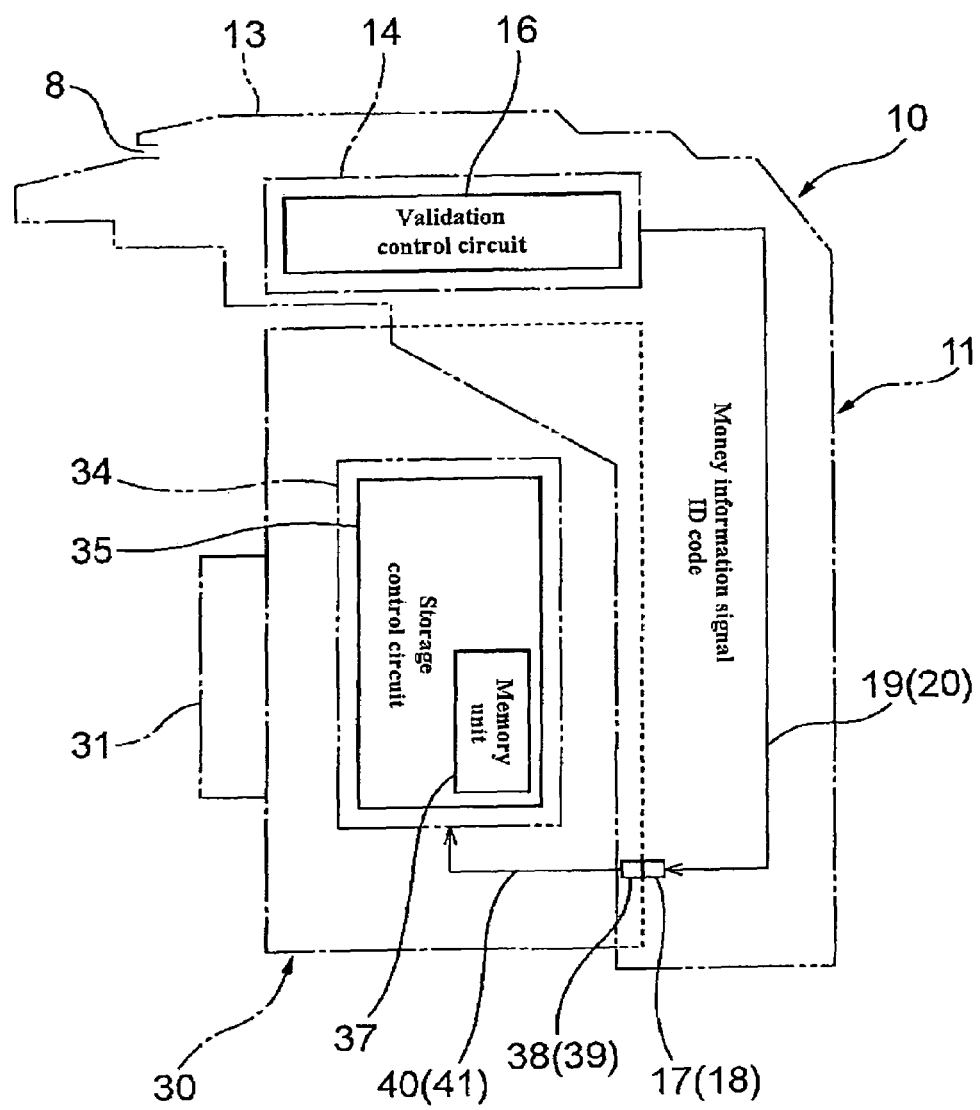
FIG. 4 is a block diagram of a control circuit for controlling the cash dispensing machine and the storage unit.

FIG. 2 is a perspective view of an example of a cash dispensing machine 10 provided within the slot machine, FIG. 3 is a perspective view of the cash dispensing machine 10 with a storage unit 30 thereof being detached from a main body 11 of the cash dispensing machine 10 and FIG. 4 is a block diagram of a control circuit for controlling operations of the main body 11 and the storage unit 30.

The cash dispensing machine 10 is constructed with the main body 11 having the bill insertion slot 8 and the storage unit 30 detachable from the main body 11. A validation unit 13 for validating a bill inserted through the bill insertion slot 8 is provided in the main body 11.

The validation unit 13 houses a validation control circuit 16 formed on a circuit substrate 14. The validation control circuit 16 performs a drive control of a motor for feeding bills, a validation control for validating the bill on the basis of an output signal of a sensor (not shown), which is obtained when the bill passes through it and a transmission control for transmitting ID information (coded information) preliminarily attached to the validation unit 13 to the storage unit 30 together with information related to the valid bill.

In a specific embodiment, the validation control circuit 16 includes a CPU (not shown) for executing the above mentioned control operations according to a program stored in a ROM (not shown). The validation control circuit 16 generates information of cash (information of bills in this embodiment) including an amount of cash, a kind of cash, etc. The validation control circuit 16 serially formats information of the cash and the ID information and transmits it to a storage control circuit 35 formed on a substrate 34 provided on the side of the storage unit 30 to be described later.

The main body 11 includes a pair of connecting terminals 17 and 18, which are connected to the validation control circuit 16 formed on the circuit substrate 14 with power and signal lines 19 and 20 for feeding power through them as well as transmitting/receiving various signals.

The storage unit 30 is detachable from the main body 11 as shown in FIG. 3 and, when it is attached to the main body 11, functions to stock a bill, which is inserted into the main body 11 through the bill insertion slot 8 and validated by the validation unit 13. A handle 31 for detaching the storage unit 30 from the main body 11 is provided on a front surface of the storage unit 30 and reclosable lid 32 for deriving bills stocked within the storage unit 30 is provided on a lower surface of the storage unit 30. On an upper surface of the storage unit 30, a bill port 33 for receiving bills inserted through the bill insertion slot 8 is formed.

The circuit substrate 34 having the storage control circuit 35 formed thereon is provided within the storage unit 30. The storage control circuit 35 receives information of bills and ID information transmitted from the validation control circuit 16 and stores the received information in a memory unit 37 such as RAM.

In a specific embodiment, the storage control circuit 35 includes a CPU for executing the above mentioned receiving control operation according to the program stored in the ROM. The storage control circuit 35 arithmetically operates the transmitted information of the cash and the ID information according to the program and stores it together with the ID information in the memory unit 37 with using a predetermined format.

The storage unit 30 further includes a pair of connecting terminals 38 and 39, which are connected to the storage control circuit 35 formed on the substrate 34 with power and signal lines 40 and 41 for feeding power through them as well as transmitting/receiving the signals. That is, the connecting terminals 38 and 39 are connected to the connecting terminals 17 and 18 on the side of the main body 11 when the storage unit 30 is assembled to the main body 11. Therefore, the above mentioned power supply and transmission and receiving of the signals are possible.

As described above, the storage unit 30 detached from the main body 11 holds information of the bills and the ID information in the memory unit 37 of the storage control circuit 35 within the storage unit 30. This information can be read by connecting the storage unit 30 to a storage unit connecting device 60 connected to a terminal computer 50 (the upper means) as shown in FIG. 5.

Figure 5:
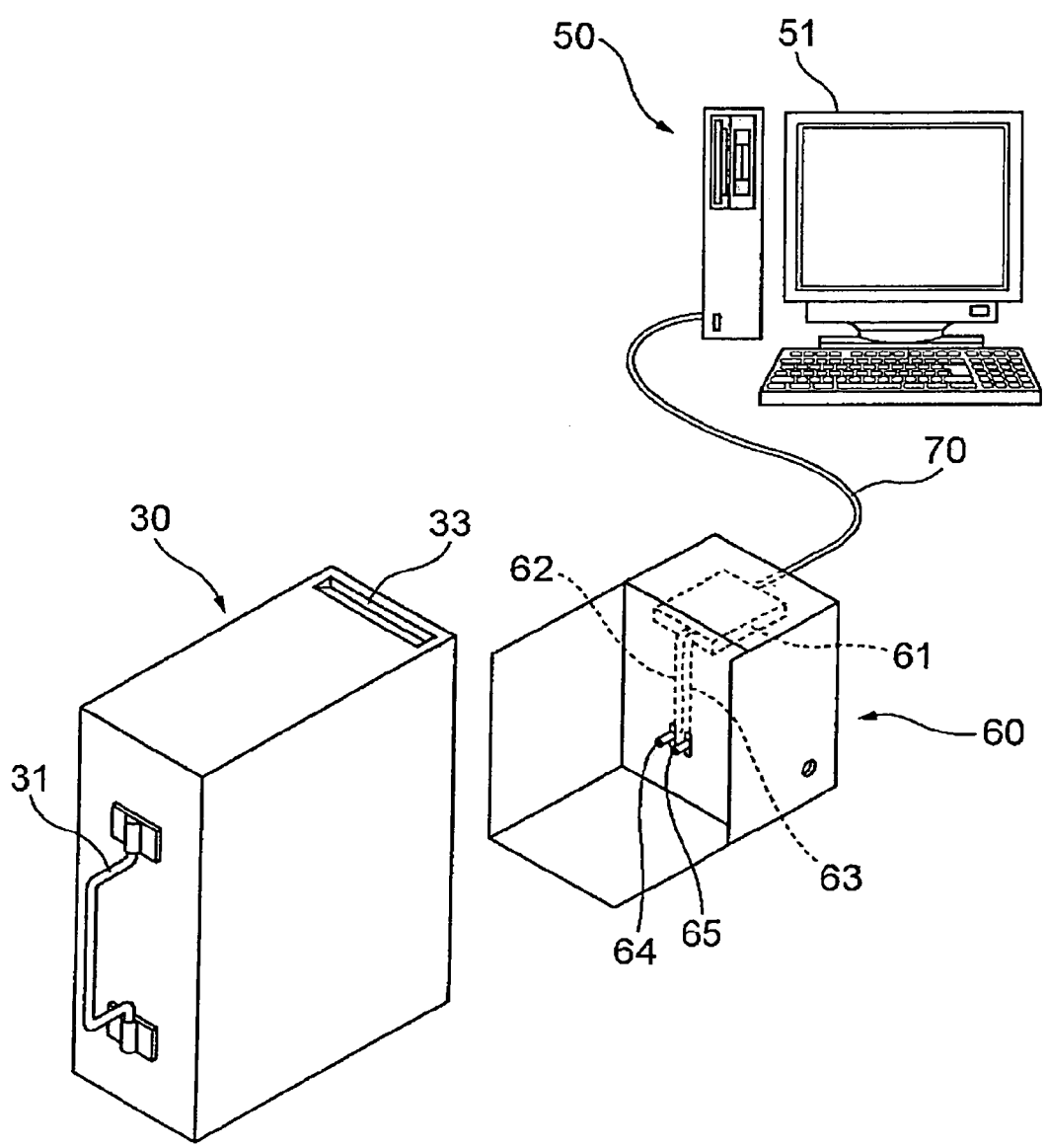
FIG. 5 is a perspective view of an example of a connecting device for connecting the storage unit.

The storage unit connecting device 60 shown in FIG. 5 has a relay function for transmitting a control signal for opening the reclosable lid 32 of the storage unit 30 from the terminal computer 50 when the bill in the storage unit 30 is to be collected or receiving information of the bills stored in the memory unit 37 of the storage unit 30 and relaying it to the terminal computer 50 when the terminal computer 50 collects information of the bills stored in the storage unit 30.

By the provision of the storage unit connecting device 60, it becomes possible for, for example, a manager of an amusement center to confirm information of the bills together with the ID information by connecting the storage unit 30 to the terminal computer 50 and displaying information of the bills stored in the storage unit 30 on a monitor 51 through the terminal computer or to collect the bill by unlocking the reclosable lid 32 by transmitting the control signal from the terminal computer to the storage unit 30.

The storage unit connecting device 60 is connected to the terminal computer 50 through connecting terminals of such as a USB cable 70 and includes a circuit substrate 61 on which a cash collection control circuit having functions of transmitting the control signal from the terminal computer 50 to the storage unit 30 and transmitting information of the bills and the ID information related to the cash stored in the storage unit 30 to the terminal computer 50 is mounted.

Similarly to the cash dispensing machine 10, one of the ends of power and signal lines 62 and 63 for feeding power and transmitting and receiving signals are connected to the cash collecting control circuit formed on the substrate 61 and the other ends of the power and signal lines 62 and 63 are connected to connecting terminals 64 and 65, respectively. The connecting terminals 64 and 65 are electrically and mechanically connected to the connecting terminals 38 and 39 of the storage unit 30 when the latter unit is connected to the storage unit connecting device 60, similarly to the connection of the storage unit 30 to the cash dispensing machine 10.

According to the cash dispensing machine including the storage unit constructed as mentioned above, every time a game player inserts a bill into a certain slot machine through the bill insertion slot 8 thereof, an information of the bills thereof together with ID information specific to the validation unit 13 of the cash dispensing machine housed in the slot machine are stored in the memory unit 37 of the storage control circuit 35 of the storage unit 30. The information is kept in the memory unit 37 until the storage unit 30 is detached from the main body 11 and the information is erased.

Therefore, since information of the bills associated with the ID information specific to the slot machine and hence the cash dispensing machine is stored in the memory unit 37 of every storage unit 30, it becomes possible to know how much cash is inserted into which slot machine even when the storage unit 30 of the slot machine is detached from the latter slot machine and set in another slot machine.

The information, which includes information of the cash associated with the ID information and is memorized, may take various forms according to the program. For example, information of the cash is memorized together with the ID information every time a bill is inserted as shown in FIG. 6(a) or a total amount of cash inserted into every slot machine, and hence every cash dispensing machine, is memorized as shown in FIG. 6(b). Therefore, it is easily possible to confirm how much cash is inserted into which slot machine, so management of the bills in association with the slot machines can be performed easily.

Although the present invention has been described with reference to the preferred embodiments, the present invention is not limited to the described embodiments and the described embodiments can be modified within the scope of the present invention.

For example, a wireless signal transmission between the cash dispensing machine and the storage unit may be performed without using the signal lines between the connecting terminals provided in the cash dispensing machine and the storage unit, respectively. Further, the information related to cash, which is stored together with the ID information, is not limited to those shown in FIG. 6(a) and FIG. 6(b). For example, information related to date and time of bill insertion may be used in addition to information of the cash and the ID information.

As described hereinbefore, according to the present invention, it is possible to easily know how much cash is received by which gaming machine even when the storage units of cash dispensing machines provided in respective gaming machines are exchanged between the respective gaming machines.

What is claimed is:

1. A cash dispensing system, comprising:
   a cash dispensing machine; and
   a computer,
   wherein the cash dispensing machine comprises:
   a validation unit for validating cash inserted through an insertion slot;
   a storage unit for storing cash, the storage unit being detachable from the cash dispensing machine;
   first communication means provided in the validation unit, for transmitting information of the cash and ID information of the cash, to the storage unit, the ID information including date and time of cash insertion into the validation unit;
   second communication means provided in the storage unit for transmitting/receiving the information and the ID information from the first communication means; and
   a memory unit provided in the storage unit, for checking the information against the ID information, and storing the information and the ID information, including the date and time of the cash insertion into the validation unit,
   wherein the information from the validation unit stored on the memory unit in the storage unit remains available when the storage unit is detached from the validation unit and attached to another validation unit, to permit confirmation of the amount of cash received from each validation unit.

2. A cash dispensing system, comprising:
   a cash dispensing machine; and
   a computer,
   wherein the cash dispensing machine comprises:
   a validation unit for validating cash inserted through an insertion slot;
   a storage unit for storing cash, the storage unit being detachable from the cash dispensing machine;
   first communication means provided in the validation unit, for transmitting information of the cash and ID information of the cash, to the storage unit, the ID information including date and time of cash insertion into the validation unit;

second communication means provided in the storage unit for transmitting/receiving the information and the ID information from the first communication means;

a memory unit provided in the storage unit, the memory unit being associated with a storage control circuit in the storage unit, for checking the information against the ID information, and storing the information and the ID information, including the date and time of the cash insertion into the validation unit; and connection terminals between the validation unit and the storage unit for providing power from the validation unit to the storage control circuit of the storage unit, wherein the information from the validation unit stored on the memory unit in the storage unit remains available when the storage unit is detached from the validation unit and attached to another validation unit, to permit confirmation of the amount of cash received from each validation unit.

3. A cash dispensing machine, comprising:

a validation unit for validating cash inserted through an insertion slot;

a storage unit for storing cash, the storage unit being detachable from the cash dispensing machine;

first communication means provided in the validation unit, for transmitting information of the cash and ID information of the cash, to the storage unit;

second communication means provided in the storage unit for transmitting/receiving the information and the ID information from the first communication means;

a storage control circuit and associated memory unit provided in the storage unit, for checking the information against the ID information, and storing the information and the ID information; and connection terminals between the validation unit and the storage unit for providing power from the validation unit to the storage control circuit of the storage unit, wherein the information from the validation unit stored on the memory unit in the storage unit remains available when the storage unit is detached from the validation unit and attached to another validation unit, to permit confirmation of the amount of cash received from each validation unit.

4. The cash dispensing machine, according to claim 3, wherein the cash dispensing machine is transmittable with a computer via the second communication means.

5. The cash dispensing machine, according to claim 3, wherein the ID information provided by the validation unit and stored on the memory unit in the storage unit includes date and time of cash insertion into the validation unit.

* * * * *